United States Patent [19]

Linss et al.

[11] Patent Number: 4,806,091

[45] Date of Patent: Feb. 21, 1989

[54] APPARATUS FOR MANUFACTURING A PLASTIC HOLLOW BODY WITH A BLOW-MOLDED BODY PART

[75] Inventors: Gerhard Linss; Karl F. Ossberger, both of Weissenburg, Fed. Rep. of Germany

[73] Assignee: Ossberger-Turbinenfabrik GmbH, Weissenburg, Fed. Rep. of Germany

[21] Appl. No.: 154,280

[22] Filed: Feb. 10, 1988

[30] Foreign Application Priority Data

Feb. 12, 1987 [DE] Fed. Rep. of Germany ....... 3704265

[51] Int. Cl.⁴ .............................................. B29C 49/06
[52] U.S. Cl. .................... 425/529; 215/1 C; 264/537; 425/533
[58] Field of Search ................ 428/35, 36; 215/1 C; 425/503, 522, 528, 529, 532, 533, 566, 466; 264/537, 539

[56] References Cited

U.S. PATENT DOCUMENTS

| 2,908,034 | 10/1959 | Hackett | 264/539 |
|---|---|---|---|
| 2,936,481 | 5/1960 | Wilkalis et al. | 264/539 X |
| 3,032,810 | 5/1962 | Soubier | 264/539 |
| 3,115,682 | 12/1963 | Soubier et al. | 264/539 X |
| 3,144,493 | 8/1964 | Santelli | 264/539 X |
| 3,288,898 | 11/1966 | West | 264/503 |
| 3,343,210 | 9/1967 | Guignard | 425/529 X |
| 3,394,209 | 7/1968 | Cheney | 264/533 X |
| 3,855,380 | 12/1974 | Gordon et al. | 264/161 X |
| 4,188,179 | 2/1980 | Linss et al. | 425/531 |
| 4,406,854 | 9/1983 | Yoshino | 264/532 |

FOREIGN PATENT DOCUMENTS 2528029 1/1977 Fed. Rep. of Germany ...... 425/528

*Primary Examiner*—Richard L. Chiesa
*Attorney, Agent, or Firm*—Holman & Stern

[57] ABSTRACT

In an apparatus for manufacturing a hollow body, the hollow body comprises an injection-molded head piece, a body part formed by blow molding a preform segment which segment is integral with the head piece. The apparatus comprises a ring-shaped nozzle wherein a ring-shaped nozzle opening is defined between a nozzle cone piece and a nozzle opening piece. The apparatus further comprises a withdrawal device operative with respect to the ring-shaped nozzle, which withdrawal device is axially, reciprocally movable and has a recess. It is desired to enable production of different and/or novel configurations of the body parts of the hollow body. This is achieved by means for an additional mold device which is provided for an additional forming operation operative on the preform segment adjoining the head piece, which operation relates to the walls of the body part. The additional mold device provides an offset in the radial sense with respect to the ring-shaped nozzle opening. By providing a specific radial offset between the nozzle opening and other parts of the apparatus, one can produce special configurations of the preform segment prior to the blowing operation.

15 Claims, 4 Drawing Sheets

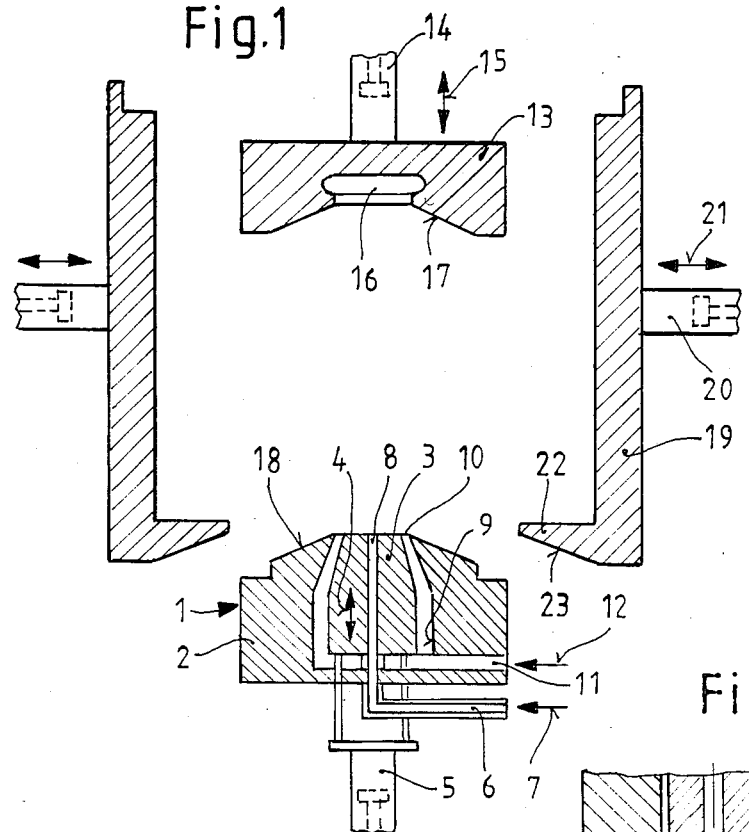
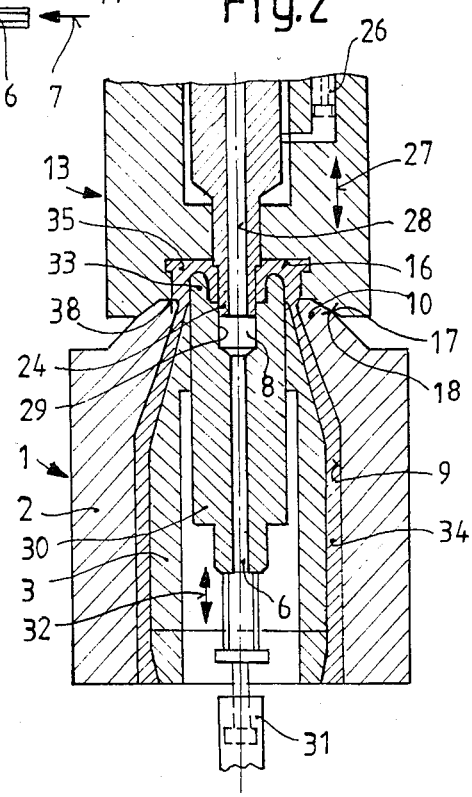

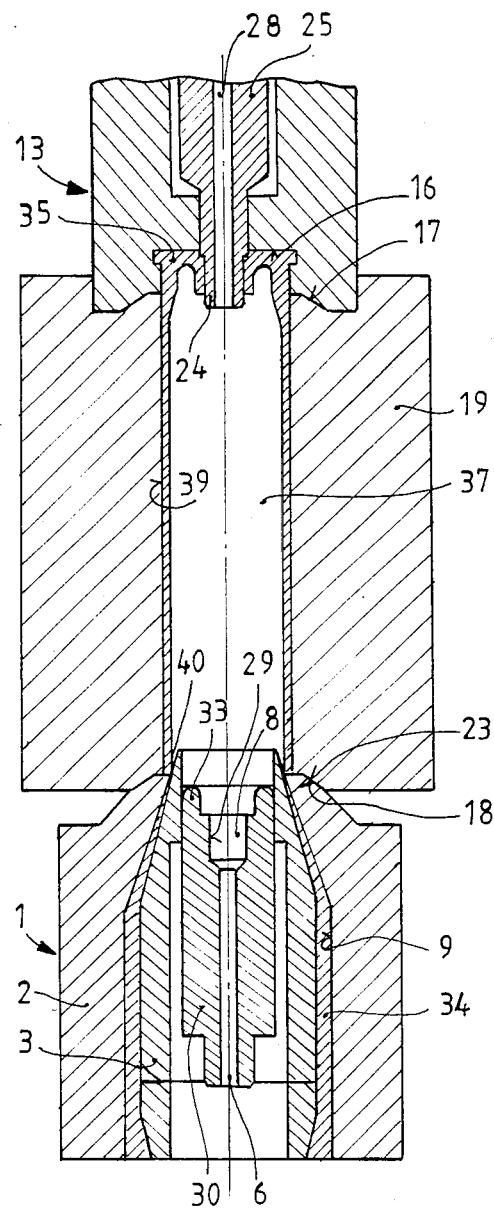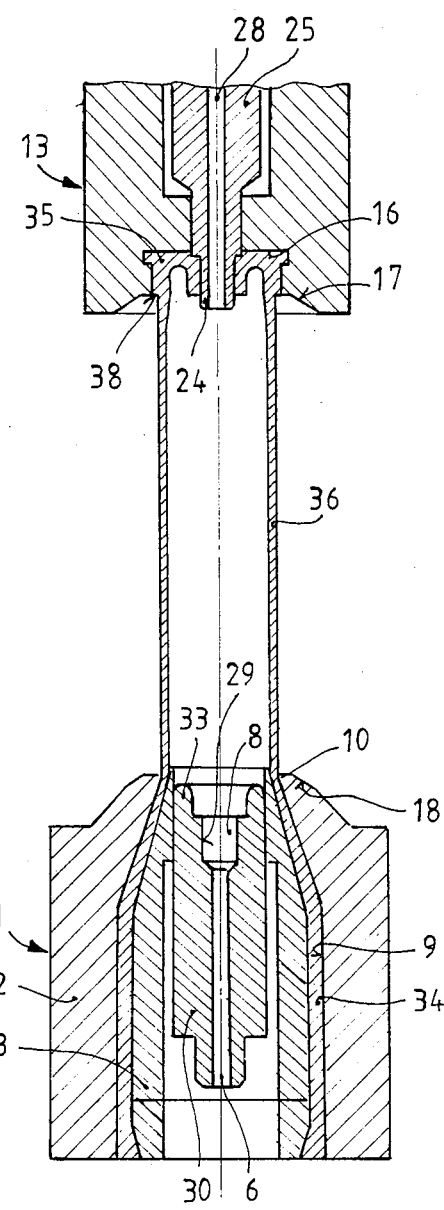

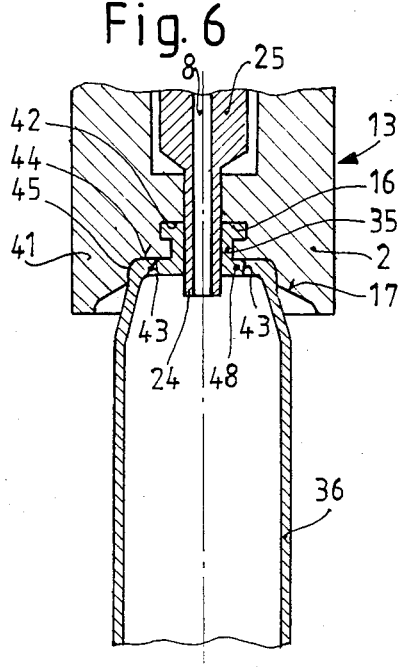
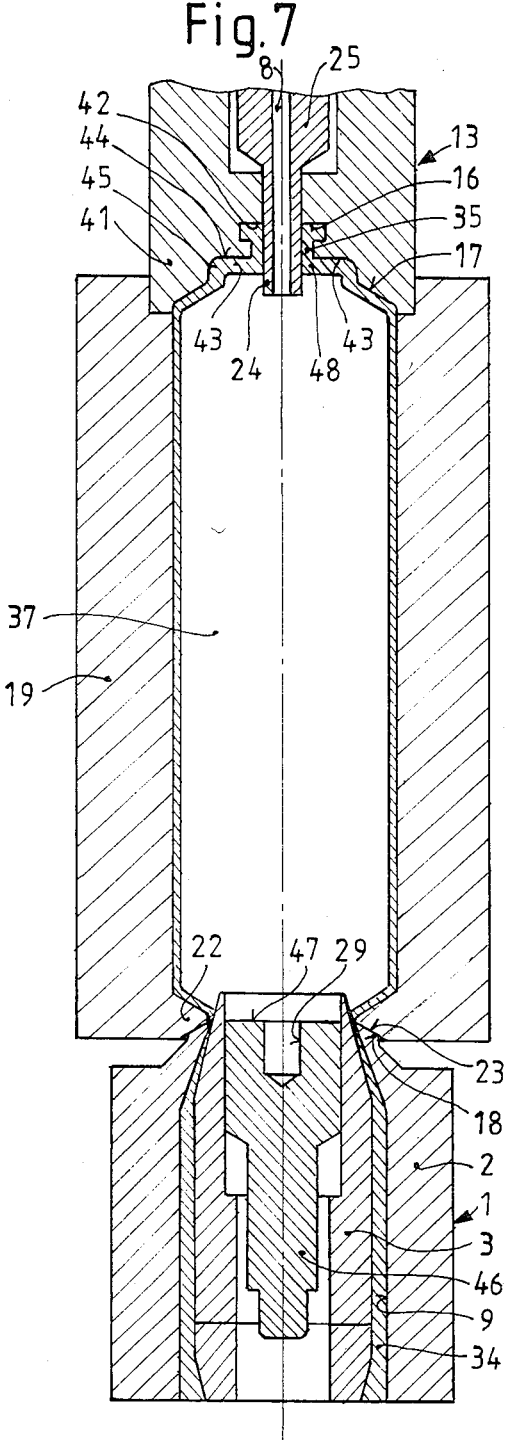
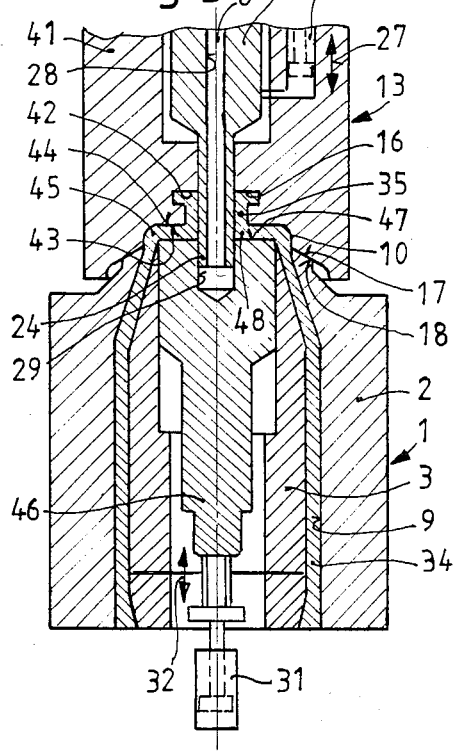

APPARATUS FOR MANUFACTURING A PLASTIC HOLLOW BODY WITH A BLOW-MOLDED BODY PART

BACKGROUND OF THE INVENTION

The invention relates to an apparatus for manufacturing a hollow body from thermoplastic plastic material, said hollow body comprised of an injection-molded head piece, a body part formed by blowing e.g., blow molding a preform segment which segment is integral with the head piece, and (possibly) a bottom member formed by press-forming the preform segment, wherewith the said apparatus comprises a ring-shaped nozzle wherein a ring-shaped nozzle opening is defined between a nozzle cone piece (hereinafter "cone piece") and a nozzle opening piece (hereinafter "nozzle piece"), said apparatus further comprises a withdrawal device operative with respect to the ring-shaped nozzle, which withdrawal device is axially reciprocally movable and has a recess, and said apparatus comprises a blow mold with a plurality of blow mold parts which are laterally reciprocally movable.

In a known apparatus of the type described (Ger. Pat. No. 2,528,029), the preform segment is press-formed only to form the bottom pieces of the blow-molded parts, and is then blown, wherewith the ring-shaped nozzle opening is closed by means of the outer edge of the opening of the aforesaid recess, which recess opening faces the ring-shaped nozzle, and its said outer edge is also the outer edge of the head-piece space in the said recess, and wherewith, before each blowing, the ring-shaped nozzle opening is a direct continuation of the preform tube segment. There are numerous possible forms of body parts of hollow bodies which cannot be fabricated with this apparatus.

SUMMARY OF THE INVENTION

Accordingly, it is an object of the invention to devise an apparatus of the type described initially supra, which enables body parts of hollow bodies to be manufactured which have different and/or novel forms. This object is achieved according to the invention in that an additional mold device is provided for an additional forming operation (in addition to blowing and possible bottom pressing) operative on the preform segment adjoining the head piece and involving the walls of the body part of the hollow body, wherewith said additional mold device provides different dimensions which are offset with respect to the ring-shaped nozzle opening.

Before the blowing, an additional molding of the preform segment is carried out, whereby a correspondingly shaped hollow body is produced from the thus molded preform segment; whereas previously (according to the state of the art) the preform segment was merely extruded from the nozzle opening and molded by blowing into the blow mold. Because of the deviation between the transverse radial dimensions of the nozzle opening and the other parts of the device (which deviation is absent with known apparatuses), special configurations of the preform segment can be produced prior to the blowing operation.

A second object of the invention is to devise an apparatus of the type described initially supra whereby a hollow body may be manufactured the body part of which is flush with the outer edge of the head piece but wherewith said body part undergoes (i.e., has undergone) blowing e.g., blow molding. This object is achieved according to the invention in that:

The ring-shaped nozzle opening is displaced radially inward with respect to the outer edge of the opening of the recess in the withdrawal device, which latter opening is directed toward the ring-shaped nozzle, and The closed blow-mold parts leave free the region of the said recess opening which radially outwardly extends beyond the nozzle opening.

An injection-molded head piece is produced. Its diameter on its part directed toward the ring-shaped nozzle is greater than the diameter of the pressed i.e., extruded tubular preform segment. The preform segment is blown, as is customary, to provide a thin wall and to save plastic. For given desired diameters of the head piece and the hollow body, the inventive difference in transverse, radial dimensions enables a more substantial widening of the body part to be achieved in the blowing operation. The blown region of the preform segment adjoins the injection-molded head piece and is fused to it. The exterior of the blow region of the preform segment is hot enough (without additional measures being employed) that it will solidly fuse with the injection-molded head piece; the pressure developed by the blowing of the preform segment is sufficient to effect this fusing together.

It is particularly advantageous if the inner wall surface of the closed blow-mold parts adjoins the outer edge of the recess opening of the recess, which opening is directed toward the ring-shaped nozzle. In some hollow bodies, e.g. weapons cartridges, the outer diameter of the body part is equal to the outer diameter of the injection-molded head piece. The blowing is then carried out with the result of reduction of the wall thickness of the tubular region of the preform segment.

It is further particularly advantageous (in a different embodiment) if the the inner wall of the closed blow-mold parts is at a distance from the outer edge of the ring-shaped nozzle opening. A bottomless hollow-body body part is formed wherein the tubular region of the preform segment is disjoint from or "freed from" the nozzle opening, due to the fact that the plastic is severed and blown. The outer diameter of the body part between the withdrawal device and the ring-shaped nozzle can be larger than the diameter of the nozzle opening.

It is also particularly advantageous if, when the withdrawal device rests on the ring-shaped nozzle, a ring-like extension of the ring-shaped nozzle extends into the recess of the withdrawal device, and if a narrow extension e.g. a blow nozzle on the withdrawal device extends into the said ring-like extension of the ring-shaped nozzle. The use of this ring-like extension on the ring-shaped nozzle and this narrow extension on the withdrawal device enables recesses and the like to be produced in the head piece, whereby material is saved. Because the distance in the radial sense between the laterally outer part of the extension (on the ring-shaped nozzle) and the inner edge of the nozzle opening is very small, when the tubular preform is being extruded the said extension (on the ring-shaped nozzle) is retracted; in this way, the preform cannot adhere to the said extension. A ring-shaped wall of the head piece is produced between the narrow extension (on the withdrawal device) and the ring-like extension (on the ring-shaped nozzle) (see FIG. 2).

It is particularly advantageous also if, during extrusion, the ring width of the ring-shaped nozzle opening is at most equal to the transverse distance between the outer edge of the nozzle opening and the outer edge of the opening in the recess on the withdrawal device, which latter opening faces the ring-shaped nozzle. This dimensioning gives satisfactory savings of plastic while producing a firm fusion where the head piece and body piece join.

A third object of the invention is to devise an apparatus of the type described initially supra, wherein the outer diameter of the body part is unusually large relative to the outer diameter of the head piece. This object is achieved according to the invention in that there is a radial distance between the ring-shaped nozzle opening and the outer edge of the head piece cavity i.e. the part of the recess in the withdrawal device wherein the head piece is molded, with the outer edge of the head piece cavity being radially outward of the ring-shaped nozzle opening, wherewith the side of the recess facing the ring-shaped nozzle has a disc-shaped space which radially extends beyond the head piece cavity, and when the withdrawal device rests on the ring-shaped nozzle the edge regions of said disc-shaped space extend over but not necessarily beyond the ring-shaped nozzle opening.

The outer diameter of the tubular segment of the blown (blow-molded) preform is greater than the outer diameter of the head piece because the injection molded disc forms a shoulder and cover of the head piece. Because the disc contributes to the diameter of the hollow body, in the blowing operation one achieves a hollow body diameter which is much greater than that which can be achieved with a preform which has the same wall thickness as the preform according to the invention and which otherwise corresponds to i.e. has the same radial dimensions as the head piece. For a preform with a given wall thickness, there is a limit to the extent to which it can be radially blown. The diameter of the extruded tuburlar part is increased.

It is particularly advantageous if a reciprocally movable plunger is provided in the nozzle cone piece, wherewith the end face of the plunger bounds the disc space in the recess of the withdrawal device. This plunger can be used to reduce the thickness of the injection-molded disc, to a degree not achievable with injection molded alone.

It is further particularly advantageous if a blow nozzle extending into the recess of the withdrawal device also extends into a bore of the ring-shaped nozzle when the withdrawal device rests on the ring-shaped nozzle. Although the ring-shaped nozzle does not have an extension from it which extends into the said recess, and the blow nozzle on the withdrawal device does not end in the material of the head piece, it is made possible to carry out blowing which originates from the withdrawal device.

It is also particularly advantageous if the diameter of the disc space is at least twice that of the head piece cavity at the transition to the disc space. This widening is achievable in any case (and even greater widening may be achievable); it provides a substantial increase in the diameter of the hollow body.

A fourth object of the invention is to devise an apparatus of the type described initially supra wherein the outer diameter of the body part of the manufactured hollow body is in certain regions smaller than the diameter of the extruded (un-blown) tubular segment. This object is achieved according to the invention in that a molding extension is provided on a reciprocally movable mandrel, which molding extension extends between radially inwardly projecting regions of the closed blow-mold parts, such that said inwardly projecting regions of the blow-mold parts press the corresponding parts of the preform segment against said molding extension, wherewith the ring-shaped nozzle opening is radially outwardly configured with respect to the outer contour of the molding extension.

After the extrusion, the molding extension is advanced downward, and serves as a tool for forming the interior configuration of the corresponding body part region, which configuration is of reduced diameter; and said molding extension also serves as a support member for the (radial) compression of a region of the tubular preform by the blow-mold parts. When the blow-mold parts are moved together, their radially inwardly projecting regions press the preform radially inwardly against the molding extension. As a result, the outer diameter is reduced, and the preform segment in this region is not blown outward.

The molding extension can be inserted from the withdrawal device or from the ring-shaped nozzle. It determines the wall thickness and the bottom thickness.

It is particularly advantageous if the reciprocally movable mandrel comprises the blowing device with blow openings. The mandrel serves to move and position the molding extension, and is also integrated into the blowing means.

It is further particularly advantageous if the molding extension is installed opposite i.e., to function oppositely to a reciprocally movable plunger, wherewith a region of the preform can be pressed between the free ends of the molding extension and plunger, respectively. The extruded preform may also undergo press forming in the axial radial direction.

It is also particularly advantageous if the molding extension is provided on the withdrawal device and the plunger is provided on the ring-shaped nozzle. In this way a hollow body can be produced which is closed on the bottom and open on the top (to allow penetration of the molding extension).

It is particularly advantageous also if the molding extension projects axially even when the withdrawal device rests on the ring-shaped nozzle, wherewith the molding extension extends into one of said devices. Thus, if the molding extension is mounted on the withdrawal device, it extends into the ring-shaped nozzle; and if mounted on the ring-shaped nozzle, it extends into the withdrawal device. Accordingly, it not necessary to provide drive means to retract the molding extension into the device on which it is mounted.

BRIEF DESCRIPTION OF THE DRAWINGS

Preferred embodiments of the invention are illustrated in the drawings.

FIG. 1 is a schematic vertical cross section of an apparatus for producing a plastic hollow body having a blow-molded body part;

FIG. 2 is a vertical cross sectional view of essential parts of a second apparatus for producing a plastic hollow body having a blow-molded body part, in a first operating position;

FIG. 3 shows the apparatus of FIG. 2 in a second operating position;

FIG. 4 shows the apparatus of FIG. 2 in a third operating position;

FIG. 5 is a vertical cross sectional view of essential parts of a third apparatus for producing a plastic hollow body having a blow-molded body part in a first operating position;

FIG. 6 shows the apparatus of FIG. 5 in a second operating position;

FIG. 7 shows the apparatus of FIG. 5 in a third operating position;

DETAILED DESCRIPTION OF THE INVENTION

Figure 8:
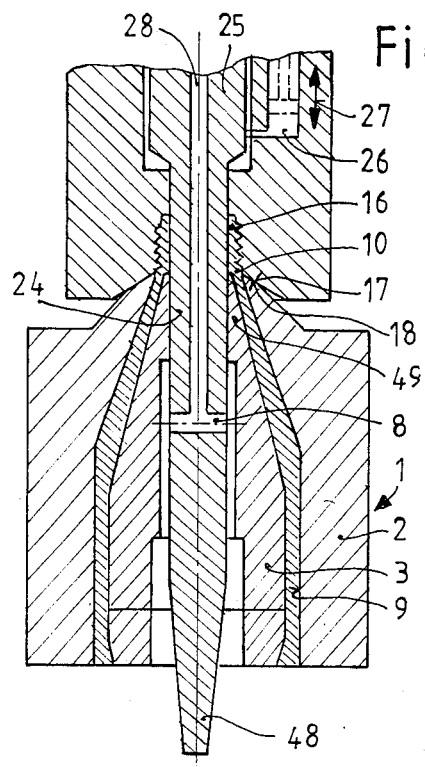
FIG. 8 is a vertical cross sectional view of essential parts of a fourth apparatus for producing a plastic hollow body having a blow-molded body part, in a first operating position.

The apparatus according to FIG. 1 has a ring-shaped nozzle 1, comprised of a fixed nozzle piece 2 wherein a cone piece 3 is reciprocally movable (arrows 4) by a piston and cylinder device 5. Compressed air is supplied to the cone piece 3 from below, via a tube 6 (arrow 7). This air exits the cone piece at the top front via a centrally disposed blow opening 8. The cone piece 3 and nozzle piece 2 together define a ring-shaped channel 9 which upwardly merges into the ring-shaped nozzle opening 10. Thermoplastic plastic is fed to channel 9 from the bottom via a tube 11 (arrow 12). Toward the nozzle opening 10, the cone angle of the cone piece 3 is smaller than the (cone) angle of the inner surface of the nozzle piece 2, so that the nozzle opening 10 is closed when the cone piece 3 is advanced upward.

A withdrawal device 13 is provided above the ring-shaped nozzle 1, which device 13 is reciprocally movable (arrows 15) by a piston and cylinder device 14. Device 13 is provided on its lower side with a recess 16 having an undercut or other form-interlocking configuration (not illustrated) whereby the withdrawal device may be separated into a plurality of pieces and reassembled. A support surface 17 on the withdrawal device 13 is radially obliquely inclined, and viewed axially has the shape of a circular ring. An end surface 18 of the nozzle piece 2 matches support surface 17.

On both lateral sides of the ring-shaped nozzle 1 and withdrawal device 13 a blow-mold piece (19, 19) of a two-piece blow mold is provided. The pieces 19 are each reciprocally movable (arrows 21) by a respective piston and cylinder device 20. Each blow-mold piece 19 has a bottom member 22 having an inclined support surface 23 which can rest on the seat surface 18 of the nozzle piece 2.

The apparatus of FIGS. 2-4 has a largely similar structure to that of FIG. 1; accordingly the same reference numerals and description apply, mutatis mutandis. The differences will be described. These include a blow nozzle 24 on the withdrawal device 13, which nozzle 24 extends into the middle of the recess 16 and further toward the ring-shaped nozzle 1. The blow nozzle 24 has a staged (offset) configuration in the recess 16, and is disposed on a tube 25 which is reciprocally movable (arrows 27) by a piston and cylinder device 26. Compressed air is passed via a bore 28 into the tube 25 and blow nozzle 24. Thus in this embodiment the blowing air is fed both from the withdrawal device 13 and from the ring-shaped nozzle 1. When the withdrawal device 13 rests on the ring-shaped nozzle 1 (FIG. 2), the blow nozzle 24 extends into a bore 29 in the ring-shaped nozzle 1, without entirely occupying said bore 29 in its axial extent. The blow nozzle 24 inserted in the bore 29 serves to block blow opening 8 during injection i.e., injection-molding.

In the apparatus according to FIGS. 2-4, the cone piece 3 accommodates a mandrel 30 which is reciprocally movable (arrows 32) by a piston and cylinder device 31, and has tube 6 disposed in it which runs to the blow opening 8. The upper part of mandrel 30 bears a ring-shaped projection 33 which extends into recess 16 and accommodates blow nozzle 24. According to FIG. 2, thermoplastic plastic 34 is injected through nozzle opening 10 into recess 16 to form a head piece 35. Then, according to FIG. 3, a tubular preform segment 36 is withdrawn i.e., extruded, with the nozzle opening 10 being partly closed by upwardly advancing the cone piece 3. According to FIG. 4 the plastic in the nozzle opening 10 is severed, by fully upwardly advancing the cone piece 3 which has a conical surface having a smaller cone angle than the cone angle of the inner surface of the nozzle piece 2. The blow-mold parts 19 are moved against the withdrawal device 13 and the ring-shaped nozzle 1, and the preform segment is blown against the blow-mold parts 9 to form a body part 37 of a hollow body.

As may be seen from FIG. 2, the width of the opening of the recess 16 facing the ring-shaped nozzle 1 is not fully covered by the ring-shaped nozzle opening 10. Accordingly, there is a radial ridge ("offset") 38 representing the difference between the outer edge or "lower outer edge" of the recess opening (16) and the ring-shaped nozzle opening 10. This region (38) not covered by the nozzle opening 10 is covered by the nozzle piece 2. According to FIG. 3, the region of the ridge 38 does not have an adjoining preform segment. However, according to FIG. 4, when the blowing takes place the adjoining preform segment does lie i.e. comes to lie against the ridge region 38, which ridge region is left free by the blow-mold parts 19. The inner surface 39 of the blow mold adjoins the outer edge of the recess opening, so that there is a merging (matching) of the cylindrical shapes of the head piece 35 and the body part 37. The body part 37 is cylindrical down to the ring-shaped nozzle 1, because the body part 37 has been separated from the closed nozzle opening, and the inner surface of the closed blow-mold parts is at a distance from the cone piece 3 and the nozzle opening 10.

The apparatus according to FIGS. 5-7 is largely similar to that of FIG. 1; accordingly the same reference numerals and description apply, mutatis mutandis. The differences will be described. These include the lack of blowing means on the nozzle device 1. A blow nozzle 24 is provided on the withdrawal device 13, which nozzle 24 extends into the middle of the recess 16 and further toward the ring-shaped nozzle 1. The blow nozzle 24 is disposed on a tube 25 which is reciprocally movable (arrows 27) by a piston and cylinder device 26. Compressed air is passed via a bore 28 into the tube 25 and blow nozzle 24. When the withdrawal device 13 rests on the ring-shaped nozzle 1, the blow nozzle 24 extends into a bore 29 in the ring-shaped nozzle 1, without entirely occupying said bore 29 in its axial extent (FIG. 5).

The withdrawal device 13 forms a mold block 41 which has a recess 16 in it which recess is comprised of a head-piece space 42 and a disc space 43. The disc space 43 defines the opening of recess 16 which faces the ring-shaped nozzle 1, and has an outer edge which is radially outside the outer edge of the head-piece space 42 which latter outer edge is the edge of the head-piece space 42 which is disposed toward the ring-shaped nozzle 1; the offset here is represented by the ridge 44. The axial extent of the disc space 43 is much less than that of the head-piece space 42. An edge region 45 of the headpiece space 42 (FIG. 5) is disposed over the nozzle opening 10. As mentioned, there is no blowing device on the ring-shaped nozzle 10 of the apparatus of FIGS. 5-7. However, a stamp means 46 is provided in the cone piece 3, which stamp means 46 is reciprocally movable (arrows 32) by a piston and cylinder device 31. During injection molding of the head piece 35, the end face 47 of stamp means 46 borders the disc space 43 (FIG. 5) and accommodates the bore 29 at its center.

According to FIG. 5, thermoplastic plastic material 34 is injected via the fully open nozzle opening 10, to form the head piece 35 and the disc member 48 integral therewith. Then (FIG. 6), with the nozzle opening now only partly open, plastic material is extruded and the withdrawal device 13 is moved upward away, so that a tubular preform segment 36 is formed which adjoins the injection-molded disc 48 at the edge region 45 of the disc space 43. According to FIG. 7, the cone piece 3 then is fully advanced (and thus the nozzle opening 10 is completely closed), and the blow-mold parts 19 are closed, whereupon the preform segment 36 is blow-molded to produce a body part 37.

Figure 9:
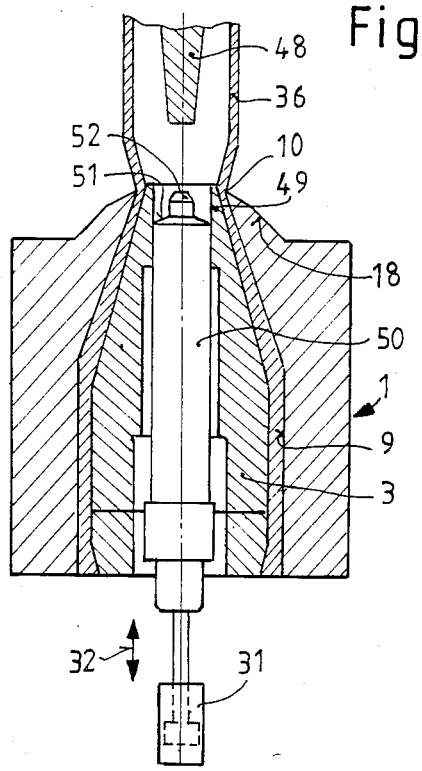
FIG. 9 shows the apparatus of FIG. 8 in a second operating position.
Figure 10:
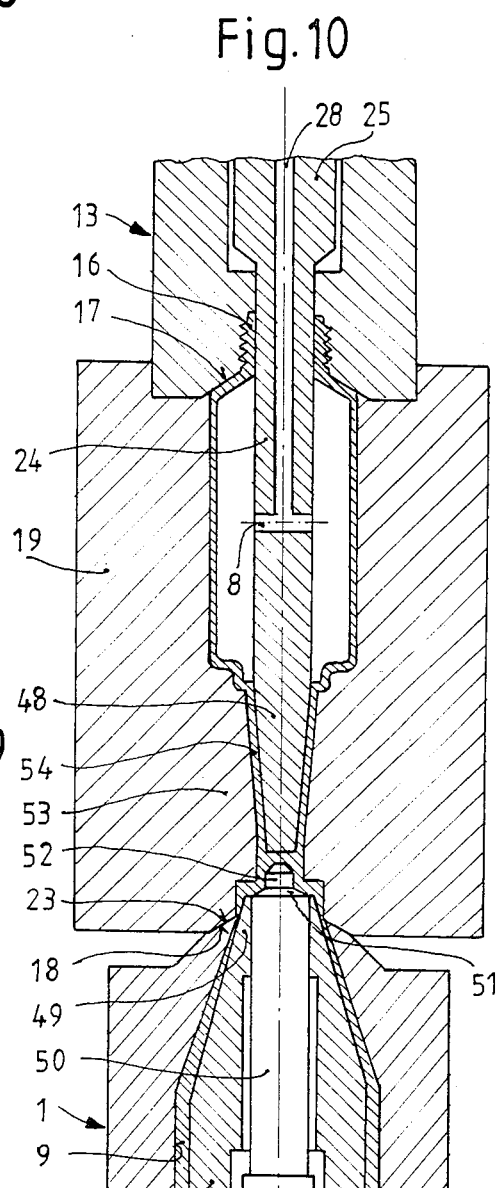
FIG. 10 shows the apparatus of FIG. 8 in a third operating position.

The apparatus according to FIGS. 8-10 is largely similar to that of FIG. 1; accordingly the same reference numerals and description apply, mutatis mutandis. The differences will be described. These include the fact that a tube 25 provided in the withdrawal device 13 is reciprocally movable (arrows 27) over a substantial distance by means of a piston and cylinder device 26. Tube 25 has toward its lower end a blow nozzle member 24 which extends not merely out of the recess 16 but (FIG. 8) into the ring-shaped nozzle 1 and an appreciable distance into the cone piece 3. A compressed air bore 28 has lateral openings 8, and there is an extension on the blow nozzle member 24 which extension extends deep into the ring-shaped nozzle 1 (FIG. 8). The diameter of the molding extension (see, FIG. 10) 48 is much less than the inner diameter of the ring-shaped nozzle opening 10, and the transverse cross sectional area of said extension 48 decreases with progression in the downward direction (toward the ring-shaped nozzle 1).

Accordingly, there is a radial difference 49 between the inner edge of the ring-shaped nozzle opening 10 and the outer surface of the molding extension 48. In the region nearest the ring-shaped nozzle 1, of the blow-mold parts 19, there are projecting zones 53, which, when the blow mold is closed (FIG. 10), terminate slightly short of the outer surface of the molding extension 48. A plunger member 50 is provided coaxial to the extension 48. Plunger 50 is associated with the ring-shaped nozzle 1, and is reciprocally movable (arrows 32) over a substantial distance, by means of a piston and cylinder device 31. The end face 51 of plunger 50 bears a molding extension 52. Plunger 50 with extension 52 is advanced upward and out of the ring-shaped nozzle 1, according to FIGS. 9-10.

According to FIG. 8, thermoplastic plastic material 34 is injected through the fully open nozzle opening 10 into the recess 16, whereby a head piece 35 is formed. The molding extension 48 disposed on the blow nozzle 24 penetrates deep into the ring-shaped nozzle 1, and the withdrawal device 13 rests on the ring-shaped nozzle 1. According to FIG. 9, the withdrawal device is moved upward ("away") with the nozzle opening 10 being partially open, i.e. with the cone piece 3 of the ring-shaped nozzle 1 being partially advanced (upward). In the process; a tubular preform segment 36 is extruded also means "withdrawn". The molding extension 48 is i.e., remains disposed in the region of said preform segment 36 which is close to the ring-shaped nozzle 1; the lower end of extension 48 is only a short distance from the ring-shaped nozzle 1. According to FIG. 9, the plunger 50 is also advanced (upward), whereby the end face 1 and the molding extension 52 are disposed a short distance below the upper end face of the cone piece 1. Then (FIG. 10), the nozzle opening 10 is closed by further advancing the cone piece 3 (upward). In the process, the plastic 34 is severed. The blow-mold parts 19 are moved together, whereby the projection zones 53 of the parts 19 press the corresponding region of the preform segment 36 against the molding extension 48, to form a pressed nipple 54 having an outer diameter which is less than that of the ring-shaped nozzle, and having a wall thickness which is greater than that of the preform segment 36. The plunger 50 is further advanced (upward), whereby the plastic disposed between the end of the molding extension 48 and the end face of the plunger is pressed as well.

We claim:

1. An apparatus for manufacturing a hollow body from thermoplastic material,
    said hollow body comprises an injection-molded head piece, a body part formed by blow molding a preform segment which segment is integral with the head piece,
    wherewith the said apparatus comprises a ring-shaped nozzle wherein a ring-shaped nozzle opening is defined between a nozzle cone piece and a nozzle opening piece, wherewith a reciprocally movable stamp means is provided in the cone piece,
    a withdrawal device operative with respect to the ring-shaped nozzle is provided, which is axially, reciprocally movable and has a recess, and
    a blow mold with a plurality of blow mold parts which are laterally, reciprocally movable is provided, with said blow mold parts being disposed laterally near the ring-shaped nozzle and the withdrawal device, whereby a blow mold is formed which, when closed, is disposed between the ring-shaped nozzle and the retracted withdrawal device; whereby the ring-shaped nozzle opening is radially outwardly offset with respect to the outer edge of a head-piece cavity of the recess on the withdrawal device; further in that the side of the recess which side is nearest the ring-shaped nozzle has a disc-shaped space which radially extends beyond the head-piece cavity and is open toward the ring-shaped nozzle, and when the withdrawal device rests on the ring-shaped nozzle the edge regions of said disc-shaped space extend over, but not necessarily beyond, the ring-shaped nozzle opening;
    and in that an end face of the stamp means forms a boundary of the disc-shaped space, and the thickness of the injection-molded disc element can be reduced with the aid of said stamp means.

2. An apparatus according to claim 1 wherein the ring-shaped nozzle opening is radially, inwardly offset with respect to the outer edge of the opening of the recess which opening faces the ring-shaped nozzle, and the closed blow-mold parts leave free the region of said recess opening which radially extends outward beyond the nozzle opening.

3. An apparatus according to claim 2 wherein the inner wall of the closed blow-mold parts is separated at a radial distance from the outer edge of the ring-shaped nozzle opening.

4. An apparatus according to claim 2 wherein the inner wall of the closed blow-mold parts adjoins the outer edge of the opening of the recess which opening faces the ring-shaped nozzle.

5. An apparatus according to claim 4 wherein when the withdrawal device rests on the ring-shaped nozzle, a ring-shaped extension extends from the ring-shaped nozzle into the recess of the withdrawal device, and a narrow extension extends from the withdrawal device into the ring-shaped extension.

6. An apparatus according to claim 4 wherein during extrusion, the ring width of the ring-shaped nozzle opening is at most equal to the transverse, radial distance between the outer edge of the nozzle opening and the outer edge of the opening in the recess on the withdrawal device, which latter opening faces the ring-shaped nozzle.

7. An apparatus according to claim 1 wherein the ring-shaped nozzle opening is radially, outwardly offset with respect to the outer edge of the head-piece cavity of the recess on the withdrawal device, wherewith the side of the recess, which side is nearest the ring-shaped nozzle, has a disc-shaped space which radially extends beyond the head-piece cavity, and when the withdrawal device rests on the ring-shaped space extend over, but not necessarily beyond, the ring-shaped nozzle opening.

8. An apparatus according to claim 7 wherein a reciprocally movable stamp means is provided in the cone piece, wherewith the end face of said stamp means forms a boundary of the disc-shaped space.

9. An apparatus according to claim 7 wherein a blow nozzle which extends into the recess in the withdrawal device also extends into a bore of the ring-shaped nozzle when the withdrawal device rests on the ring-shaped nozzle.

10. An apparatus according to claim 7 wherein the diameter of the disc-shaped space is at least twice that of the head-piece cavity at the transition between said cavity and the disc-shaped space.

11. An apparatus according to claim 1 wherein a reciprocally movable mandrel with a molding extension is provided which extends between radially, inwardly projecting regions of the closed blow-mold parts, such that said inwardly projecting regions of the blow-mold parts press the corresponding parts of the preform segment against said molding extension, wherewith the ring-shaped nozzle opening is radially outwardly offset with respect to the outer contour of the molding extension.

12. An apparatus according to claim 11 wherein the reciprocally movable mandrel comprises the blowing device with blow opening.

13. An apparatus according to one of claims 11 wherein the molding extension projects axially even when the withdrawal device rests on the ring-shaped nozzle, wherewith the molding extension extends into one of said devices.

14. An apparatus according to claim 11 wherein the molding extension is installed opposite a reciprocally movable plunger, wherewith a region of the preform can be pressed between the free ends of the molding extension and plunger, respectively.

15. An apparatus according to claim 14 wherein the molding extension is provided on the withdrawal device and the plunger is provided on the ring-shaped nozzle.

* * * * *